May 25, 1937. F. FRIES Re. 20,377

SEWAGE SLUDGE DIGESTER

Original Filed March 2, 1934 2 Sheets-Sheet 1

INVENTOR.
FRANZ FRIES,
BY
Arthur Middleton
ATTORNEY.

May 25, 1937. F. FRIES Re. 20,377

SEWAGE SLUDGE DIGESTER

Original Filed March 2, 1934 2 Sheets-Sheet 2

INVENTOR.
FRANZ FRIES,
BY Arthur Middleton
ATTORNEY.

Reissued May 25, 1937 Re. 20,377

UNITED STATES PATENT OFFICE 20,377

SEWAGE SLUDGE DIGESTER

Franz Fries, Essen-Bredeney, Germany

Original No. 2,057,567, dated October 13, 1936, Serial No. 713,684, March 2, 1934. Application for reissue November 27, 1936, Serial No. 113,005. In Germany April 6, 1933

8 Claims. (Cl. 210—2)

The gases evolved in the digestion of sewage, sewage sludge and the like in the purifying installations of cities have hitherto been conducted to an outside gasometer. It is much simpler and cheaper, and in accordance with the present invention, to construct the apparatus for digesting the sludge or sewage in such a way that it can itself act as the gasometer for storing the resulting sludge gas.

For this purpose, in accordance with the invention, the portion of a gasometer which contains the sealing liquid is constructed as container for the sewage or material to be digested and is provided with an inlet for the fresh sludge or sewage and an outlet for the purified or treated sewage or sludge, as well as with a device which operates within the bell of the gasometer for breaking up the layer of scum which tends to form and which after formation floats on top of the liquid. The bell continuously dips into the sludge or sewage which acts as the sealing liquid.

In order that the apparatus for breaking up the floating layer of scum may be driven in a simple manner by means arranged outside the bell and which is constructed so as not to prevent the upward and downward movement of the bell, the latter of which is provided with a depending central vertical tube through which a centrally located vertical driving shaft extends. The escape of rising gas through this tube, which is of small cross-section, can be prevented by a baffle or the like which surrounds but extends from the shaft, which is larger than the lowermost open end of said depending tube, and which consequently deflects any gas bubbles which may rise from the lower section of the gasometer and which might otherwise tend to pass into the lower end of said depending tube were it not for the baffle thus provided. The apparatus for breaking up the layer of scum may be provided with means for keeping the sewage or sludge in motion and also with means for effecting a collecting and raking of sedimented solids towards and into a central discharge section.

Figure 1:
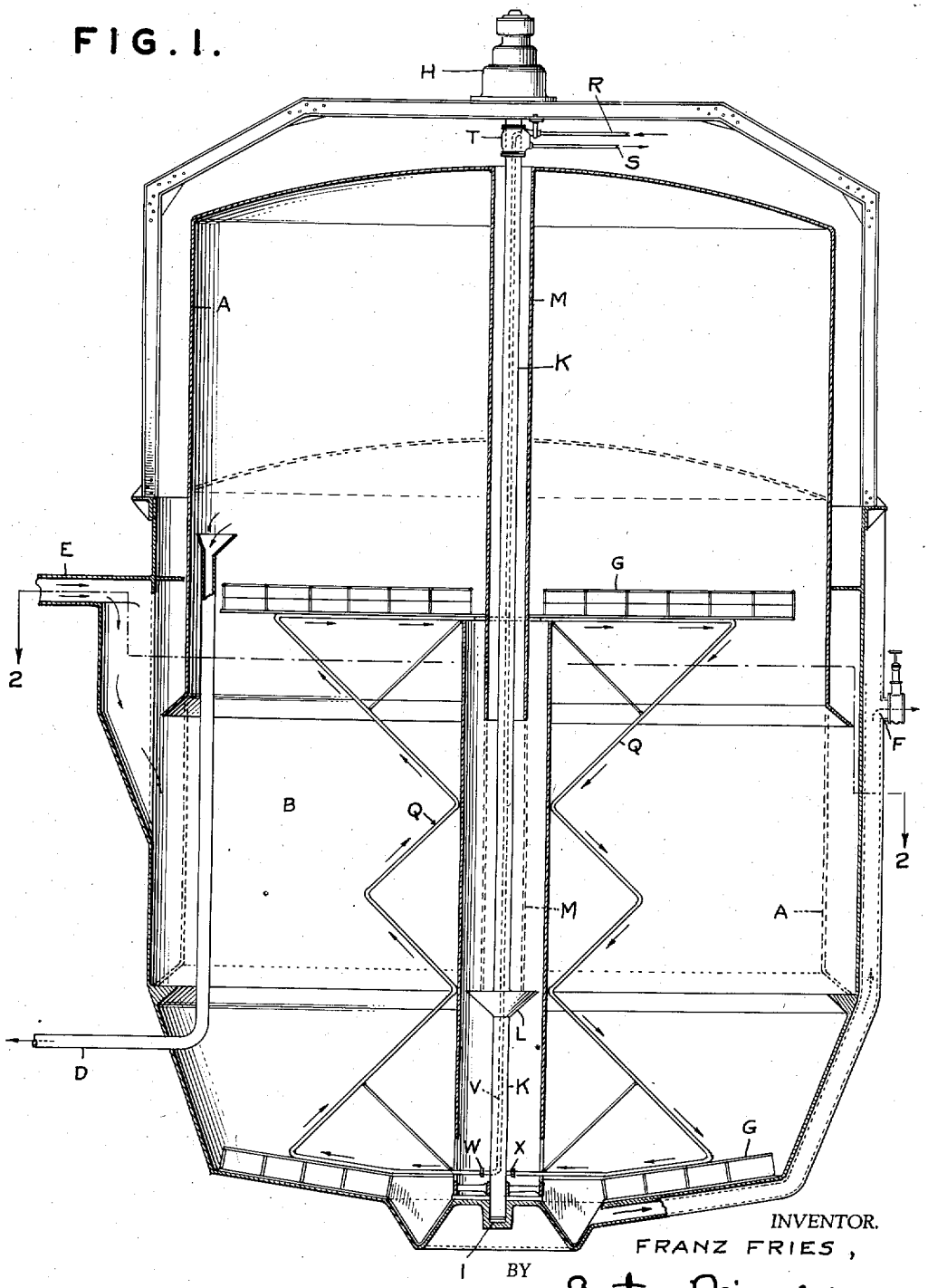
Figure 2:
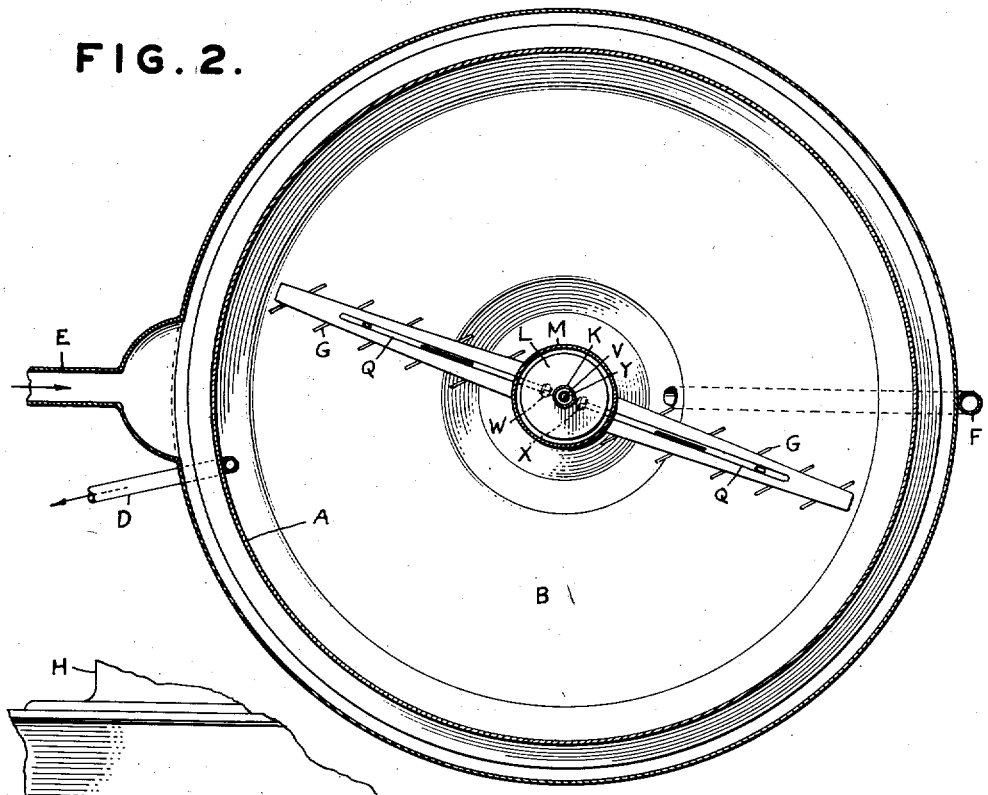
Figure 4:
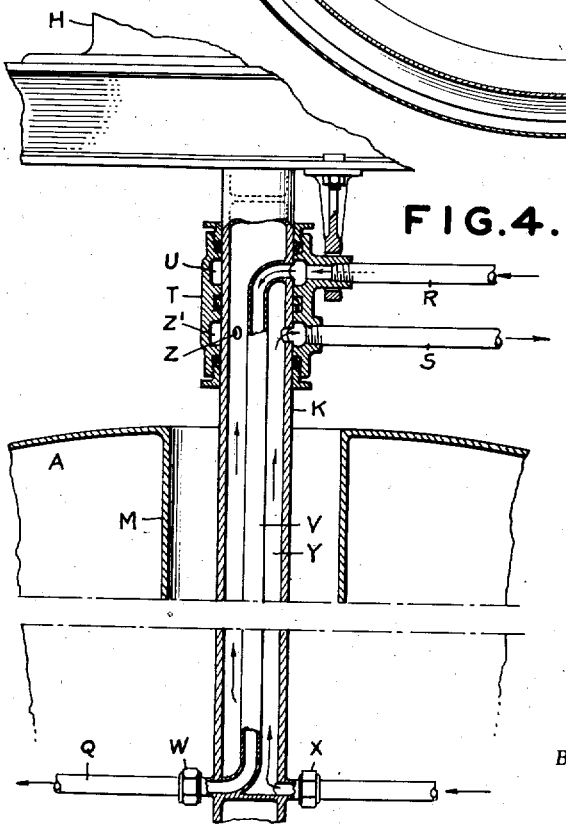
Figure 3:
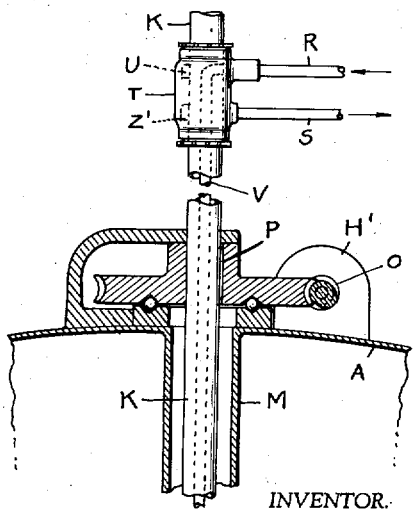

A constructional embodiment of the invention is illustrated diagrammatically, by way of example in the accompanying drawings, in which:

Figure 1 is a sectional elevation; Figure 2 is a cross-section and Figure 3 is a detail view of a modified form of construction. Fig. 4 is a detail view taken from Fig. 1 of the heating fluid inlet and outlet.

Referring to the drawings, the gasometer consists of a bell A which can be raised and lowered and dips into the sealing liquid contained in the lower part B. The gas outlet of the gasometer is through the pipe D. The lower part B is constructed as a chamber for containing sewage or sewage sludge, and is provided with a pipe E for the supply of the fresh sludge or sewage and with a pipe F for the removal of the digested or treated sludge. The sludge or sewage therefore, acts as the sealing liquid. For the purpose of breaking up the floating layer on top and for keeping the sludge in motion within the chamber, there is fitted the stirring mechanism G which is connected to the vertical shaft K which is journalled at I so that it can turn about its vertical axis but is mounted so that it does not have vertical movement, or in other words, so that it is stationary insofar as movement in a vertical direction is involved. The shaft is surrounded by a centrally located vertically extending tube M, which is inserted in and depends from the top of the bell. The bell A may be referred to as the top or upper bell shaped member and the tube M may be viewed as a portion of the top or upper member which provides an opening for and through which the shaft K extends. The shaft is operatively connected above the bell with a driving mechanism H. With this form of construction, therefore, the bell has a horizontal annular cross-section. The stirring mechanism can be driven by external driving means without the storage of gas and the upward and downward movement of the bell being in any way affected thereby. In order to entirely prevent escape of gas through the tube M, there may be fitted below it an enlargement or baffle L which extends from and surrounds the shaft K and which deflects laterally any gas bubbles rising against the same. It is known that the process of digestion or the like can be promoted by warming the sewage or sludge. For this purpose the stirring mechanism can be employed by providing it with passages or pipes through which hot gases, steam or other heating medium are conducted.

The pipe to conduct the heating medium is designated by the numeral Q. In order to effect circulation therethrough the pipe Q is connected to the vertical shaft K which is hollow shown in Fig. 4. A stationary inlet connection R and outlet connection S for the heating medium is connected with a stationary gland housing T surrounding the vertical shaft K, as known in the art as indicated by the Imhoff Patent 1,887,490, granted November 15, 1932. The heating medium enters from the stationary inlet R by way of an annular passage U in the gland housing into a falling pipe section V within the hollow shaft K. Flowing downwardly the heating medium leaves the interior of the vertical shaft K near the lower end thereof where the pipe section is shown to be connected through nipple W with the pipe Q. The heating medium then passes through a rising branch of pipe Q as indicated by arrows (see Fig. 1) and reaching the top crosses over to a falling branch of the pipe Q dropping according to the arrows shown and reenters the vertical shaft K by way of a nipple connection X, to rise in the annular space Y within the vertical tube K as shown by arrows, then to leave the system by way of passages or port holes Z in the vertical shaft K and through an annular passage $Z^1$ in the gland device through the stationary outlet connection S.

The driving apparatus or motivating mechanism for the shaft K can also be arranged on the bell. When the bell moves up and down there is a sliding engagement between the shaft K which does not have vertical movement and a portion of the driving apparatus employed for transmitting the power which is relied upon to rotate the shaft. A special stationary construction for carrying the motor independent of the bell is then unnecessary.

The form of construction in which the driving apparatus or motivating mechanism is on and carried by the bell is illustrated by Fig. 3. In this figure the bell A carries the motor H'. A worm O on the shaft of the motor engages a worm wheel P. The worm wheel is mounted on the bell, for example in ball bearings. It is coupled with the shaft K but is longitudinally displaceable along the shaft so that as the worm wheel turns it rotates the shaft. The coupling or driving connection just referred to is effected for example by means of a key or feather which fits in and engages a longitudinal grooved portion of the vertically extending shaft.

Having now particularly described and ascertained the nature of my said invention and in what manner the same is to be performed, I declare that what I claim is:

1. An apparatus for digesting sewage sludge and the like comprising in combination a lower part providing a basin or tank constructed for receiving sewage sludge or the like and for holding a body thereof while undergoing digestion or other treatment, a vertically movable bell-shaped upper member cooperatively related with said lower part and therewith providing a gasometer in which the liquid underdoing digestion functions as a sealing liquid into which the depending portion of the bell-shaped member continuously dips and relative to which the bell-shaped member rises and falls in accordance with the increase and decrease in the volume of gas contained or entrapped therein, a stirring mechanism located within said gasometer, a vertical shaft mounted in a bearing member located and provided at the lower interior portion of said basin or tank, which shaft is mounted so as to turn about a vertical axis but remaining relatively stationary as respects any vertical displacement during the turning thereof in its normal operation, and which said shaft as it turns functions as the means by and through which said stirring mechanism is actuated, said upper bell-shaped member having therethrough an opening which is provided within and by a tubular portion depending from the top portion thereof into the liquid body within the basin whereby a liquid seal is provided between the shaft on the one hand and the tubular portion on the other, and motivating mechanism located above said top portion of the bell-shaped member and cooperatively connected with said shaft whereby said shaft and said stirring mechanism can be actuated from said motivating mechanism regardless as to whether the bell-shaped upper member is at rest or is undergoing vertical movement incident to the increase or decrease in the volume of gas within the gasometer.

2. In a gasometer construction as defined in and by the claim last preceding, an enlargement or baffle which surrounds and extends from the vertical shaft and which is larger than the area of the opening in the lower end of the tubular portion through which the shaft extends whereby any gas bubbles rising upwardly against said baffle will be deflected laterally, thus preventing the escape of gas bubbles through the opening provided within and by the tubular portion.

3. In a construction as defined in and by claim 1, the inclusion of means whereby the motivating mechanism is mounted on a stationary support.

4. In a construction as defined in and by claim 1, an arrangement according to which the motivating mechanism is directly mounted on the vertically movable top or bell-shaped upper member and in which the driving of the vertical shaft is effected because of a feather or key in a rotating member of the motivating mechanism and which feather or key has vertical movement in a vertically extending grooved portion provided in and by the shaft.

5. In a construction as defined in and by claim 8, a baffle which surrounds and extends from the rotatable carrying member and which is larger than the area of the opening at the lowermost end of the tubular portion that provides the opening through which the rotatable carrying member extends whereby, because of said baffle, any gas bubbles rising upwardly against said baffle will be deflected laterally, thus preventing the escape of such gas bubbles through said opening; and also an interiorly located annular projection which extends inwardly from the upwardly extending walls of the tank to a position directly below and inwardly beyond the lower edge of the depending marginal flange of the floating top member, whereby any gas bubbles rising upwardly against said annular projection will be deflected laterally, thus preventing the escape of such gas bubbles through the space between the depending marginal flange and the lower section providing the tank.

6. An apparatus for digesting sewage sludge and for collecting and storing gases developed incident to the digestion carried out therein, which said apparatus comprises, in combination, a lower member provided by a sludge holding tank having a bottom, upwardly-extending boundary walls, sludge supply means leading to the interior portion thereof and discharge means leading from the lower interior portion thereof, a floatable vertically-movable top member provided by a bell-shaped top having a cap portion and a depending marginal flange, the outer portion of which depending marginal flange approximately conforms in size and shape to the interior of the upwardly extending boundary walls of the sludge holding tank and which, because of constantly dipping into the sludge, effects a seal for preventing the escape of gas from the interior of the apparatus past the lower edge portion thereof and into and through the space between it and the interior of the upwardly-extending boundary wall of the tank, sludge solids engaging members providing essential members of the settled solids collecting and raking means that functions, incident to a turning of said solids engaging means, about a vertically extending axis, which said solids collecting and raking means comprises a rotatable power-transmission member that extends upwardly from the interior portion of the tank into an opening in the cap portion of the floatable vertically-movable top member, the construction being such that a seal is provided for preventing the escape of any substantial amount of gas from the interior of the apparatus through said opening into which said rotatable power-transmission member extends, an exteriorly located motor for effecting turning movement—about the vertically extending axis—of said rotatable power transmission member and of the member driven thereby for thereby effecting a collecting and raking of settled solids from diverse sections of the bottom of the tank to said discharge means, and a gas conducting pipe or conduit leading downwardly within the interior portion of said tank or basin and thence curving laterally so as to pass outwardly through the boundary walls of the tank, the entrance end of which pipe being at an elevation which is approximately close to that of the upper edge portion of the upwardly-extending boundary walls of the tank, which pipe extends downwardly within the tank a sufficient distance before passing laterally outwardly through the boundary walls of the tank to allow space for the desired range of vertical movement for the floatable top member but which curves laterally and extends outwardly at an elevation above that of the path of movement for certain members of the settled solids collecting and raking means.

7. An apparatus for digesting sewage sludge and for collecting and storing gases developed incident to the digestion carried out therein, which said apparatus comprises, in combination, a lower member provided by a sludge holding tank having a bottom, upwardly extending boundary walls, sludge supply means leading to the interior portion thereof and discharge means for settled solids leading from the lower interior portion thereof, a floatable vertically movable top member provided by a bell-shaped top having a cap portion and a depending marginal flange, the outer portion of which depending marginal flange approximately conforms in size and shape to the interior of the sludge holding tank and which, because of constantly dipping into the sludge, effects a seal for preventing the escape of gas from the interior of the apparatus past the lower edge portion thereof and into and through the space between it and the interior of the upwardly extending boundary wall of the tank, members providing essential mechanical elements of a stirring mechanism that function, incident to a turning thereof, about a vertically extending axis, which said stirring mechanism comprises a rotatable power transmission member that extends upwardly from the interior portion of the tank or basin into an opening in the cap portion of the floatable vertically movable top member, which top member substantially extends from the boundary wall of the tank to the rotatable power transmission member and dips into liquid whereby a seal is provided for preventing the escape of any substantial amount of gas from the interior of the apparatus through the opening into which said shaft extends, means exteriorly located in respect to said floatable vertically movable top member for effecting turning movement of said shaft and of the member associated therewith and driven thereby about the vertically extending axis thereof and relative to the top member, and a gas conducting pipe leading downwardly within the interior portion of said apparatus and ultimately outwardly through the tank or basin structure, the entrance end of which pipe is at an elevation which approaches the elevation of the upper edge portion of the upwardly extending boundary wall of the tank.

8. An apparatus having a chamber with a relatively closed top and within which chamber there is carried out the digesting of sewage sludge, which apparatus comprises, in combination, a lower section providing a tank with upstanding boundary walls and constructed for receiving sewage sludge and for holding therein the body of liquid while undergoing digestion, a floating top member providing at the underside thereof a gas receiving and collecting space, said floating top member being cooperatively related with said lower section and therewith providing an enclosed chamber into which the liquid to be treated is passed and from which the treated liquid is passed through suitable discharge means leading therefrom, a rotatable carrying member mounted and driven so as to turn about a vertically extending axis and extending downwardly to and within the interior of the tank structure, mechanism comprising an outwardly extending arm operated by said carrying member which rotatable carrying member is relatively stationary as against vertical displacement as it turns during the normal operation thereof, said floating top member having a cap portion from the margin of which there depends a flange and from an intermediate portion of which there depends a tubular portion providing an opening upwardly into which said rotatable carrying member extends, the lower edge portion of which flange and the lower end portion of which tubular portion each dips into liquid whereby a relatively gas-tight seal is provided as between the depending marginal flange of the floating top and the upwardly extending boundary walls of the tank and also as between said depending tubular portion of the floating top and the rotatable carrying member.

FRANZ FRIES.